United States Patent [19]

Ishiyama

[11] Patent Number: 5,170,999
[45] Date of Patent: Dec. 15, 1992

[54] VIBRATION ISOLATING DEVICE, AND METHOD FOR MANUFACTURING SAME

[75] Inventor: Tatsuro Ishiyama, Kanagawa, Japan
[73] Assignee: Bridgestone Corporation, Tokyo, Japan
[21] Appl. No.: 839,055
[22] Filed: Feb. 18, 1992

Related U.S. Application Data

[63] Continuation of Ser. No. 442,046, Nov. 27, 1989, abandoned.

[30] Foreign Application Priority Data

Nov. 25, 1988 [JP] Japan ................. 63-297894

[51] Int. Cl.⁵ .............................................. F16M 1/00
[52] U.S. Cl. ................................ 267/140.12; 267/219; 248/562; 248/636
[58] Field of Search .............. 267/140.1 A, 140.1 AE, 267/140.1 C, 140.1 R, 35; 248/562, 632, 636

[56] References Cited

U.S. PATENT DOCUMENTS

| | | | |
|---|---|---|---|
| 4,693,456 | 12/1990 | Kanda | 267/140.1 |
| 4,720,087 | 12/1990 | Duclos et al. | 267/140.1 |
| 4,728,086 | 12/1990 | Ishiyama et al. | 267/140.1 |
| 4,749,173 | 12/1990 | Kanda | 267/140.1 |
| 4,893,798 | 1/1997 | Hibi et al. | 267/140.1 |

FOREIGN PATENT DOCUMENTS 62-224746 10/1987 Japan .
2207215 1/1989 United Kingdom ......... 267/140.1 C Primary Examiner—Robert J. Oberleitner
Assistant Examiner—Chris Schwartz
Attorney, Agent, or Firm—Jordan and Hamburg

[57] ABSTRACT

A vibration isolating device has a liquid chamber which is hollow space defined mainly by a vibration absorbing main body made of an elastic material containing a natural rubber having a low loss factor and a flexible membrane made of an elastic material containing a heat- and ozone-resistant rubber and in which a liquid is charged, the liquid chamber being divided into liquid sub-chambers which communicate through a passage. The vibration absorbing main body in which an inner cylinder is inserted and the flexible membrane are attached by vulcanizing to an intermediate cylindrical case. A metallic cylinder in which the aforementioned passage is formed and the intermediate cylindrical ase are press fitted in an outer cylinder. The passage exctends from the outer circumference of the intermediate cylindrical case to the outer cylinder.

5 Claims, 3 Drawing Sheets

VIBRATION ISOLATING DEVICE, AND METHOD FOR MANUFACTURING SAME

This application is a continuation of application Ser. No. 07/442,046, filed Nov. 27, 1989, now abandoned.

BACKGROUND OF THE INVENTION

1. Field of the Invention

The present invention relates to a vibration isolating device having a liquid chamber which is a space defined mainly by a vibration absorbing main body and a flexible membrane and in which a liquid is charged, the liquid chamber being divided into liquid sub-chambers which communicate through a passage, and a method for manufacturing the vibration isolating device.

2. Description of the Prior Art

Among the conventional vibration isolating devices of this kind, a vibration isolating device is well known which comprises an annular vibration absorbing main body made of an elastic material containing a natural rubber having a low loss factor and which is concave at the top thereof and also has attached on the outer circumference thereof a clamping ring to which a top plate is fixed by caulking, a receptacle having an arch-like sectional shape being attached on the inner bottom circumference of the vibration absorbing main body, and a flexible membrane disposed along the bottom surface of the receptacle and having the circumferential edge sandwiched between the receptacle and a bottom plate. There is formed in the top of the receptacle an orifice which provides communication between the liquid chamber formed above the concavity of the vibration absorbing main body and the liquid chamber between the receptacle and flexible membrane (Japanese Utility Model Provisional Publication No. 110344/82 and Japanese Patent Provisional Publication No. 70240/86).

The above mentioned conventional vibration isolating device is not of a so-called bush type structure having inner and outer cylinders, and its structure is not suitable for improving the damping effect by lengthening the orifice.

SUMMARY OF THE INVENTION

The present invention has an object to provide a bush type vibration isolating device having a flexible membrane which is not degraded even at a high temperature and a long orifice, and a method for manufacturing the vibration isolating device.

The above-mentioned object is accomplished by providing a vibration isolating device comprising, according to the present invention, a liquid chamber which is a hollow space defined mainly by a vibration absorbing main body made of an elastic material containing a natural rubber having a low loss factor and a flexible membrane made of an elastic material containing heat- and ozone-resistant rubber and in which a liquid is charged, the liquid chamber being divided into liquid sub-chambers which communicate through a passage, the vibration absorbing main body in which an inner cylinder is inserted and the flexible membrane being attached to an intermediate cylindrical case by vulcanizing, the passage being formed between the outer circumference of the intermediate cylindrical case and an outer cylinder, and a metallic cylinder in which the passage is formed and the intermediate cylindrical case being press-fitted in the outer cylinder. In such a vibration isolating device, generation of ozone cracks can be prevented, permitting the flexible membrane to be of a reduced thickness, and the dynamic spring constant can be limited to a low value for the vibration absorbing main body to provide anti-vibration performance peculiar to the vibration isolating device. Also, the vibration isolating device according to the present invention is of a bush type structure, so that the passage can be lengthened and the passage length can be freely designed to make the most of the damping effect of the liquid.

The method for manufacturing the vibration isolating device according to the present invention comprises the steps of clamping an injection mold with an inner cylinder and a split-structure intermediate cylindrical case set inside the mold, and injecting an elastic material containing a heat-and ozone-resistant rubber unto the cavity formed for one of the split parts of the intermediate cylindrical case while injecting an elastic material containing a natural rubber into the cavity for the other split part of the intermediate cylindrical case and inner cylinder, thereby forming a vibration absorbing main body and flexible membrane in the respective cavities. According to the present invention, another method is provided which comprises the steps of setting a semifinished product not yet vulcanized but generally shaped into the form of the flexible membrane in the cavity for the flexible membrane and injecting an elastic material such as natural rubber into the other cavity, thereby forming a vibration absorbing main body and flexible membrane in the respective cavities. Since the vibration absorbing main body and flexible membrane are attached to the split-structure intermediate cylindrical case by vulcanizing, vibration isolating devices can be produced rapidly and massively by the injection molding by these methods.

These and other objects and advantages of the present invention will be better understood from the ensuing description made, by way of example, of the embodiments of vibration absorbing main body according to the present invention with reference to the drawings.

DETAILED DESCRIPTION OF THE PREFERRED EMBODIMENTS

Figure 1:
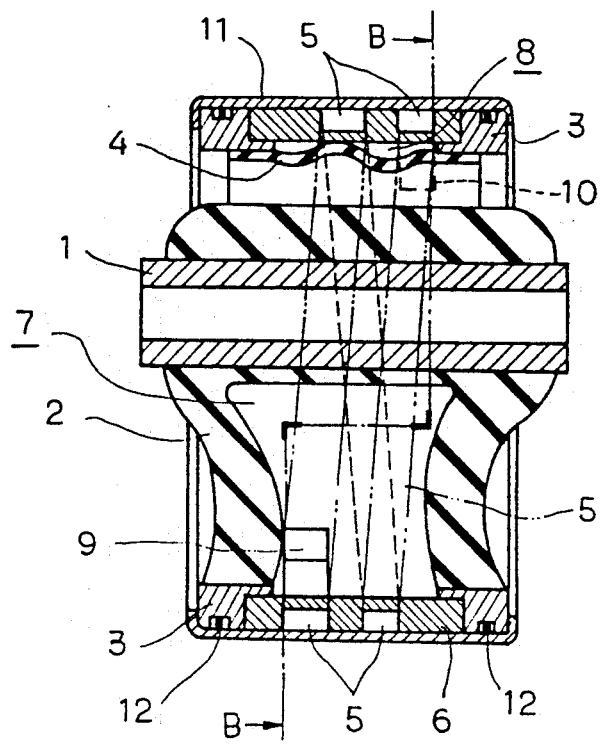
FIG. 1 is a sectional view taken along the line A—A in FIG. 2, showing a first embodiment of vibration isolating device according to the present invention.
Figure 2:
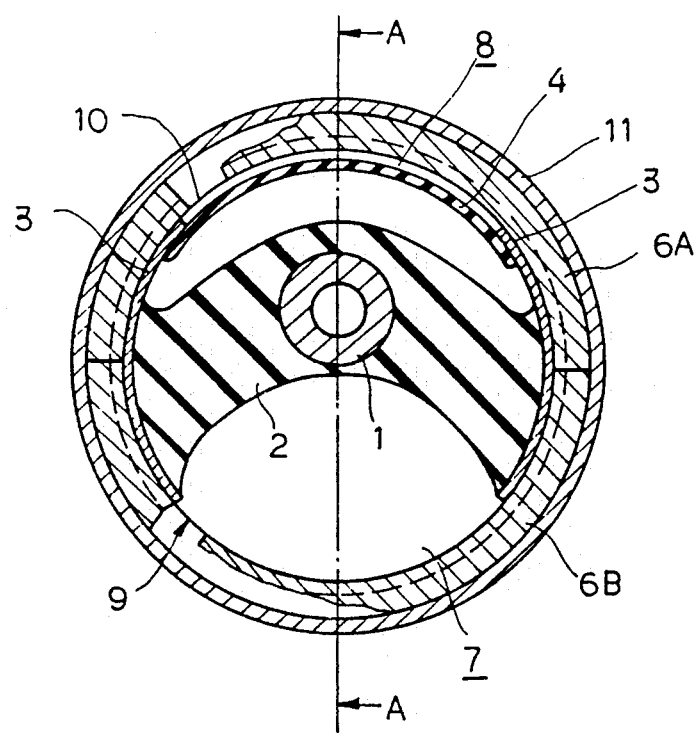
FIG. 2 is a sectional view taken along the line B—B in FIG. 1.

FIG. 1 shows a first embodiment of the vibration isolating device according to the present invention, in which an inner cylinder 1 is inserted in a vibration absorbing main body 2 attached to a split-structure intermediate cylindrical case 3 by vulcanizing. Also a flexible membrane 4 is attached to the split-structure intermediate cylindrical case 3 by vulcanizing. The vibration absorbing main body 2 is made of an elastic material containing a natural rubber having a low loss factor, while the flexible membrane 4 is made of an elastic material heat- and ozone-resistant rubber. For the vibration absorbing main body 2, a material containing natural rubber as a base and butadiene as an additive is suitable. For the flexible membrane 4, a rubber highly resistant against ozone and low in permeability, such as butyl rubber, EPT rubber or a natural rubber to which EPT rubber is added, is suitable. There is provided outside the split-structure intermediate cylindrical case 3 a metallic cylinder 6 in which a spiral passage 5 is formed, and the metallic cylinder 6 has formed therein ports 9 and 10 for communication with liquid chambers 7 and 8, respectively (see FIG. 2). The metallic cylinder 6 consists of two blocks 6A, 6B. They are fitted around the intermediate cylindrical case 3. The metallic cylinder 6 and intermediate cylindrical case 3 are inserted inside an outer cylinder 11, and they are close-fitted to each other by drawing the outer cylinder 11 to a smaller diameter. There is provided between the intermediate cylindrical case 3 and outer cylinder 11 a pair of O-rings 12 for improved sealing. Also, after the metallic cylinder 6 and intermediate cylindrical case 3 are press fitted in the outer cylinder 11, both ends of the outer cylinder 11 are caulked to prevent the cylinder 6 and case 3 from coming out.

Figure 3:
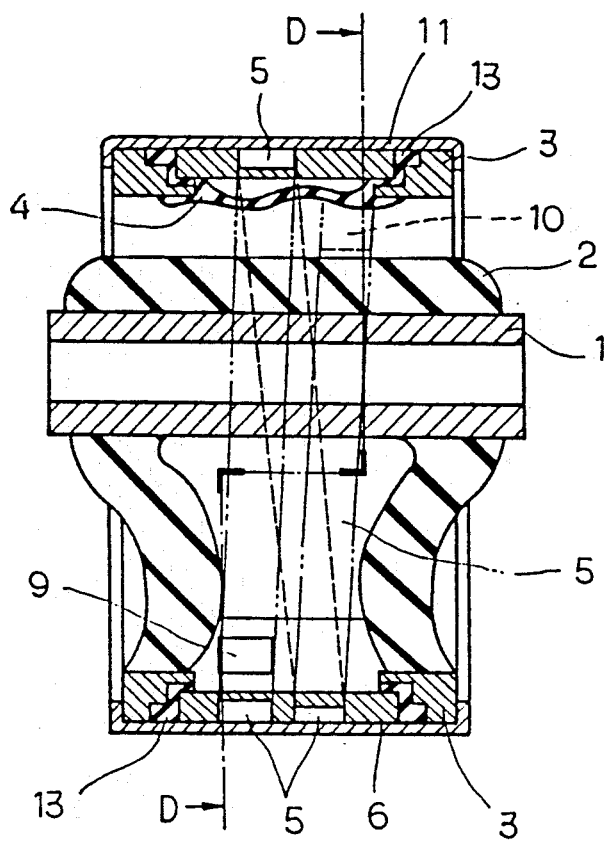
FIG. 3 is a sectional view taken along the line C—C in FIG. 4 showing a second embodiment.
Figure 4:
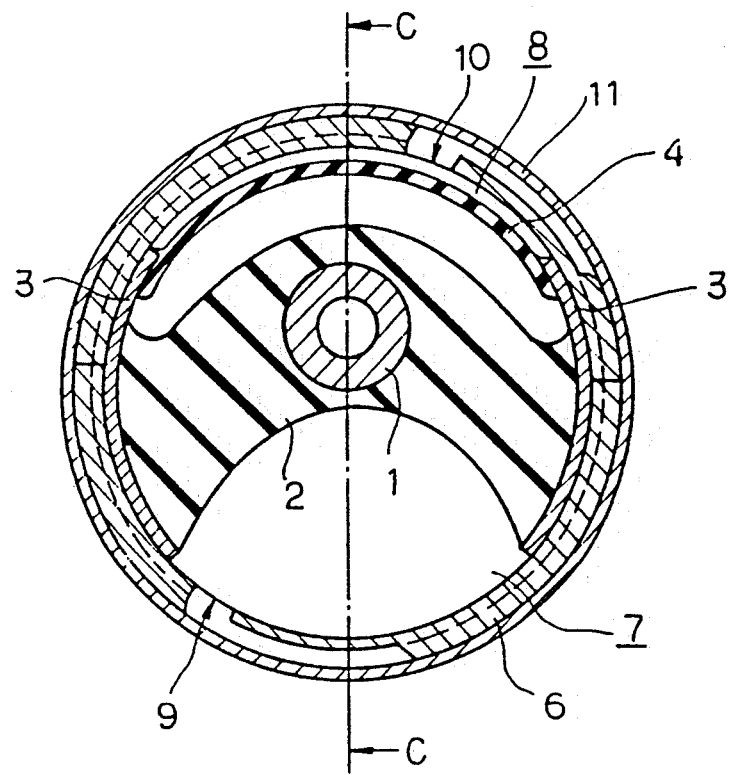
FIG. 4 is a sectional view taken along the line D—D in FIG. 3.

In the second embodiment according to the present invention shown in FIGS. 3 and 4, rubber seals 13 is made of the same kind of rubber as the flexible membrane 4 are provided on the outer circumference of the intermediate cylindrical case 3 instead of the O-rings 12 used in the first embodiment. The rest of the vibration isolating device structure is the same as in FIGS. 1 and 2, and so the vibration isolating device according to the second embodiment will not be described any further.

Figure 5:
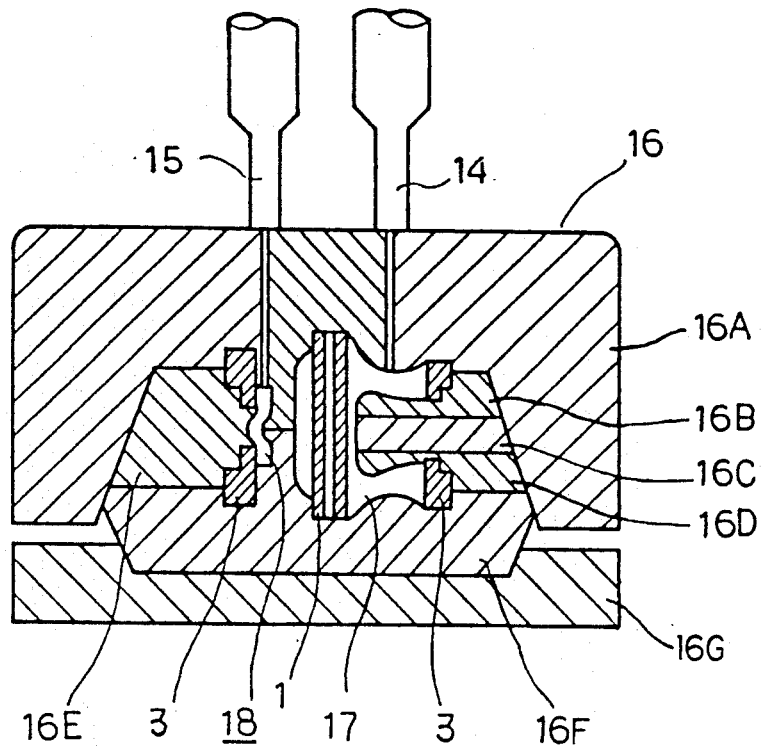
FIG. 5 is a sectional view showing the injection mold used in a method according to the present invention.

FIG. 5 shows the method for manufacturing the vibration isolating device according to the present invention. A material for the vibration absorbing main body 2 and a material for the flexible membrane 4 are injected into cavities 17 and 18, respectively, in an injection mole 16 from nozzles 14 and 15, respectively, of an injection molder (not shown). The injection mold 16 consists of an upper block 16A, middle blocks 16B to 16E and a lower block 16D and is fastened close with the inner cylinder 1 and the split-structure cylindrical case 3 set therein, and the different materials are injected into the cavities 17 and 18, respectively, from the nozzles 14 and 15, respectively. The vibration absorbing main body 2 and flexible membrane 4 thus molded by the so-called double injection molding are taken out from their respective cavities 17 and 18. The metallic cylinder 6 in which the passage is formed is installed on the outer circumference of the intermediate cylindrical case 3, and the intermediate cylindrical case 3 and the metallic cylinder 6 are inserted into the outer cylinder 11. By drawing the outer cylinder 11 to a smaller diameter, the intermediate cylindrical case 3 and metallic cylinder 6 are close-fitted to each other. A hollow space defined mainly by the vibration absorbing main body 2 and flexible membrane 4 is charged with a liquid and, therefore, constitutes a liquid chamber. The liquid chamber is divided into liquid sub-chambers 7 and 8 which communicates through the passage 5.

Figure 6:
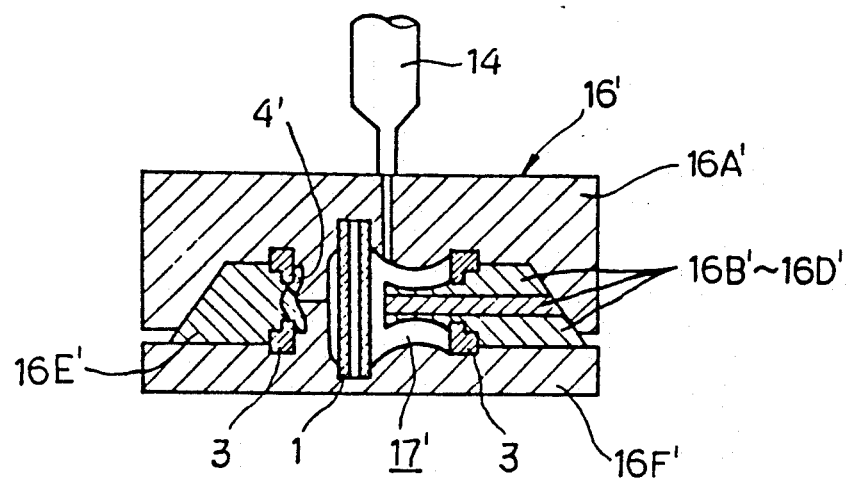
FIG. 6 is a sectional view showing the injection mold used in another method according to the present invention.

In the method for manufacturing the vibration isolating device according to the present invention shown in FIG. 6, the inner cylinder 1 and split-structure cylindrical case 3 are set inside the injection mold 16', the injection mold 16' consisting of an upper block 16A', middle blocks 16B' to 16E' and a lower block 16F', while a semifinished product 4' not yet vulcanized but generally shaped in the form of the flexible membrane is set in the cavity for the flexible membrane of a heat- and ozone-resistant rubber at the other part of the split-structure intermediate cylindrical case 3. Therefore, injection is made into the cavity 17' alone from the nozzle 14 to mold the vibration absorbing main body 2. Molding of the flexible membrane 4 takes a longer time than the vibration absorbing main body 2. So a semifinished product 4' is set beforehand and molded for a time before the vibration absorbing main body 2 in molded in the cavity 17'. Namely, in case the flexible membrane 4 is molded from, for example, a butyl rubber for which the total molding and vulcanizing time is 15 to 20 minutes, a semifinished product 4' the molding and vulcanizing of which can be completed in about 5 to 6 minutes is to be set beforehand since the time for molding and vulcanizing of a rubber containing mainly a natural rubber for the vibration absorbing main body 2 in the cavity 17 is 5 to 6 minutes. In the manufacturing method shown in FIG. 6, the flexible membrane 4 and vibration absorbing main body 2 can, therefore, be completely vulcanized at the same time.

In summary the flexible membrane in the vibration isolating device according to the present invention and which is in contact with air has an improved durability, and since a long passage can be provided in the metallic cylinder inside the intermediate cylindrical case, the damping function can be improved. Also, according to the present invention, the vibration absorbing main body and flexible membrane can be molded by a double injection molding using an injection mold, or only the vibration absorbing main body can be injected molded with a semifinished product of the flexible membrane set beforehand, whereby a vibration isolating device can be manufactured easily and rapidly.

What is claimed is:
1. A vibration isolating device comprising:
   an inner cylinder;
   an outer cylinder enclosing said inner cylinder;
   an intermediate cylindrical case substantially radially spaced from the inner cylinder and snugly received in the outer cylinder;
   a vibration absorbing main body made of an elastic material containing a natural rubber having a low loss factor, connecting said inner cylinder and said intermediate cylindrical case and being attached to said intermediate cylindrical case by vulcanization;
   a main chamber disposed at one side with respect to said inner cylinder, containing a liquid and defined mainly by said vibration absorbing main body;
   a sub-chamber disposed at one side with respect to said inner cylinder between said outer cylinder and a flexible membrane made of an elastic material containing a heat- and ozone-resistant rubber, containing a liquid and defined mainly by the membrane, the membrane being separate from and being attached separately from said vibration absorbing main body to the intermediate cylindrical case by vulcanization, and the membrane having a first surface in contact with the liquid in the sub-chamber and a second surface which is the obverse of the first surface and is in contact with air;
   a passage connecting said chambers for communication of liquid therebetween; and a cavity provided substantially parallel to an axial direction of said inner cylinder and radially inside said flexible membrane.

2. A vibration isolating device according to claim 1, further comprising a passage-forming cylinder having an exterior cylindrical face on which a groove is formed, said passage-forming cylinder being snugly received in the outer cylinder together with said intermediate cylindrical case, said groove comprising said passage.

3. A vibration isolating device according to claim 2, in which the groove is spiral and has two ends, and at each of said ends is an opening through the passage-forming cylinder, one of said openings communicating with said main chamber and the other of said openings communicating with said sub-chamber.

4. A vibration isolating device comprising:
an inner cylinder;
an outer cylinder enclosing said inner cylinder;
an intermediate cylindrical case substantially radially spaced from the inner cylinder and snugly received in the outer cylinder;
a vibration absorbing main body made of an elastic material containing a natural rubber having a low loss factor, connecting said inner cylinder and said intermediate cylindrical case and being attached to said intermediate cylindrical case by vulcanization;
a main chamber disposed at one side with respect to said inner cylinder, containing a liquid and defined mainly by said vibration absorbing main body;
a sub-chamber disposed at the other side with respect to said inner cylinder, containing a liquid and defined mainly by a flexible membrane made of an elastic material containing a heat- and ozone-resistant rubber, the membrane being attached to the intermediate cylindrical case by vulcanization, and the membrane having a first surface in contact with the liquid in the sub-chamber and a second surface which is the obverse of the first surface and is in contact with air;
a passage connecting said chambers for communication of liquid therebetween; and
a passage-forming cylinder having an exterior cylindrical face on which a groove is formed, said passage-forming cylinder being snugly received in the outer cylinder together with said intermediate cylindrical case, said groove comprising said passage.

5. A vibration isolating device according to claim 4, in which the groove is spiral and has two ends, and at each of said ends is an opening through the passage-forming cylinder, one of said openings communicating with said main chamber and the other of said openings communicating with said sub-chamber.

* * * * *